(12) United States Patent
Hayashi

(10) Patent No.: US 8,976,286 B2
(45) Date of Patent: Mar. 10, 2015

(54) IMAGING APPARATUS, LENS UNIT, AND IMAGING UNIT

(75) Inventor: Yusuke Hayashi, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 260 days.

(21) Appl. No.: 13/435,939

(22) Filed: Mar. 30, 2012

(65) Prior Publication Data
US 2012/0249843 A1 Oct. 4, 2012

(30) Foreign Application Priority Data
Apr. 1, 2011 (JP) .................................. 2011-082007

(51) Int. Cl.
*H04N 5/225* (2006.01)
*H04N 5/228* (2006.01)
*H04N 5/217* (2011.01)

(52) U.S. Cl.
USPC ......... 348/340; 348/222.1; 348/241; 348/335

(58) Field of Classification Search
CPC ................................................ H04N 5/23212
USPC ........ 348/222.1, 241–23, 256, 340, 342, 345, 348/272, 228.1, 229.1, 335
See application file for complete search history.

(56) References Cited

U.S. PATENT DOCUMENTS

| | | | | |
|---|---|---|---|---|
| 4,720,637 A * | 1/1988 | Clark | ............................. | 348/340 |
| 5,748,371 A | 5/1998 | Cathey, Jr. et al. | | |
| 8,587,681 B2 * | 11/2013 | Guidash | ..................... | 348/218.1 |
| 2010/0128137 A1 * | 5/2010 | Guidash | ..................... | 348/222.1 |
| 2011/0043666 A1 * | 2/2011 | Mitsumoto | ................... | 348/241 |

FOREIGN PATENT DOCUMENTS

JP 2003-235794 A 8/2003

* cited by examiner

*Primary Examiner* — Ahmed A Berhan
(74) *Attorney, Agent, or Firm* — Studebaker & Brackett PC

(57) ABSTRACT

An imaging apparatus comprises an optical imaging system 110, an image sensor 101, and an image processor 103. The optical imaging system 110 has an aberration control element 103 for generating a predetermined aberration. The optical imaging system 110 forms an optical image. The image sensor 101 generates an image signal corresponding to the optical image. The image processor 103 performs image processing on the image signal so as to enhance a degraded image characteristic on the basis of the predetermined aberration. The aberration control element 112 causes a response of an optical transfer function of the optical imaging system 110 to be zero at a first spatial frequency. The first spatial frequency is below a Nyquist frequency of the image sensor 201.

10 Claims, 7 Drawing Sheets

IMAGING APPARATUS, LENS UNIT, AND IMAGING UNIT

CROSS-REFERENCE TO RELATED APPLICATION

This application claims priority to Japanese Patent Application Nos. 2011-082007, filed on Apr. 1, 2011, the contents of which are incorporated herein by reference in their entireties.

TECHNICAL FIELD

The present invention relates to an imaging apparatus, a lens unit and an imaging unit, which allows increasing a depth of field.

BACKGROUND ART

In an imaging apparatus such as a camera and a video camera, it is desired that images of various subjects present at a wide range of distances from an optical imaging system be captured with less blur. That is to say, it is desired that a depth of field of the optical imaging system be increased. The depth of field can be increased by adjusting an aperture stop so as to increase the F-number. However, increasing the F-number leads to an insufficient amount of light of a subject optical image being received by a light receiving surface. Thus, measures must be taken, such as decreasing a shutter speed and increasing the ISO sensitivity of a film or an area sensor. However, decreasing the shutter speed leads to a difficulty in capturing a moving subject. Further, increasing the ISO sensitivity causes problems such as increased noise in a captured image.

For this reason, suggestion has been made that a phase mask is used to regularly disperse light beams so as to cause a response of an optical transfer function of the optical imaging system to be substantially insensitive to a wide range of object distances, and a dispersed image is captured, which subsequently undergoes a deconvolution processing operation, thereby removing blur (see Patent Documents 1 and 2). According to the invention disclosed in Patent Document 1, the image of the subject within such a range of object distances gets blurry. However, since the light beams are regularly dispersed, it is possible to reduce the blur in images of subjects present at various distances by a restoration processing operation and to increase the depth of field.

However, according to the inventions disclosed in Patent Documents 1 and 2, the response of the optical transfer function of the optical imaging system by the phase mask was low. Consequently, there was a problem in that performing a restoration processing operation so as to sufficiently reduce the blur resulted in increased noise.

RELATED ART DOCUMENTS

Patent Documents

Patent Document 1: U.S. Pat. No. 5,748,371
Patent Document 2: Japanese Patent Application Laid-open No. 2003-235794

SUMMARY OF INVENTION

Technical Problem

The present invention has been made in view of the above problem, and an object of the present invention is therefore to provide an imaging apparatus, a lens unit, and an imaging unit, which reduce a noise in a blur-free image, which is obtained by regularly dispersing light beams of a subject optical image, capturing a dispersed image, and performing an image processing operation on the dispersed image thus captured.

Solution to Problem

In order to solve the above-mentioned problem, according to a first aspect of the present invention, there is provided an imaging apparatus comprises an optical imaging system having an aberration control element for generating a predetermined aberration, the optical imaging system forming an optical image; an image sensor for generating an image signal corresponding to the optical image; and an image processor for performing image processing on the image signal so as to enhance an image characteristic on the basis of the predetermined aberration, the image characteristic having been degraded due to the predetermined aberration, the aberration control element causing a response of an optical transfer function to be zero for at least a predetermined subject distance of the optical imaging system at a first spatial frequency below a Nyquist frequency of the image sensor.

According to a first aspect of the present invention, there is provided a lens unit freely attachable and detachable to/from an imaging body, the imaging body comprising an image sensor and an image processor, the image sensor generating an image signal corresponding to an optical image formed on a light receiving surface, the image processor performing an image processing on the image signal, the lens unit comprising: an optical imaging system having an aberration control element for generating a predetermined aberration, the optical imaging system forming an optical image; a memory for storing corresponding information, the corresponding information being at least one of information about the predetermined aberration and information matched to the predetermined aberration; and an output unit for outputting the corresponding information, the aberration control element causing a response of an optical transfer function to be zero for at least a predetermined subject distance of the optical imaging system at a first spatial frequency below a Nyquist frequency of the image sensor, the image processor performing image processing on the image signal so as to enhance an image characteristic on the basis of the predetermined aberration defined by the corresponding information, the image characteristic having been degraded due to the predetermined aberration.

According to a first aspect of the present invention, there is provided an imaging unit attachable and detachable to/from an image processing apparatus, the imaging unit comprising an image sensor for generating an image signal corresponding to an optical image formed on a light receiving surface; an optical imaging system having an aberration control element for generating a predetermined aberration, the optical imaging system forming an optical image; a memory for storing corresponding information, the corresponding information being one of information about the predetermined aberration and information matched to the predetermined aberration; and an output unit for outputting the corresponding information, the aberration control element causing a response of an optical transfer function to be zero for at least a predetermined subject distance of the optical imaging system at a first spatial frequency below a Nyquist frequency of the image sensor, the image processing apparatus performing image processing on the image signal so as to enhance an image characteristic on the basis of the predetermined aberration defined by the corresponding information, the image characteristic having been degraded due to the predetermined aberration.

Effect of the Invention

In an imaging apparatus according to the present invention having a configuration as described above, it is possible to reduce a noise generated in an image obtained by regularly dispersing light beams of a subject image, capturing a dispersed image, and reducing blur from the captured image.

DESCRIPTION OF EMBODIMENTS

Hereinafter, an embodiment of a lens unit and an imaging apparatus adopting the present invention will be described with reference to the drawings.

Figure 1:
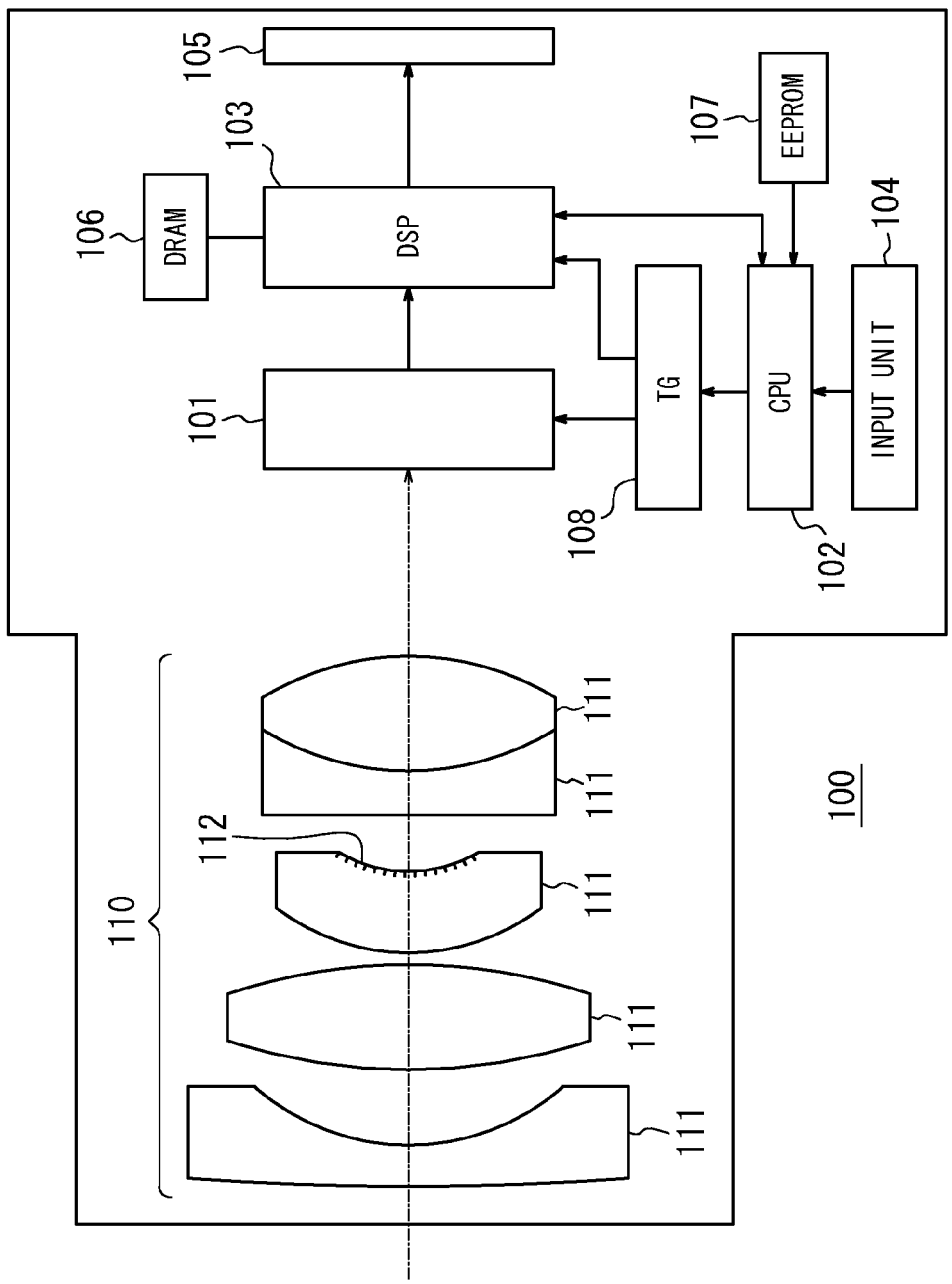
FIG. 1 is a block diagram illustrating an optical configuration and an electrical schematic configuration of a digital camera as an imaging apparatus according to an embodiment of the present invention.

FIG. 1 is a block diagram illustrating an optical configuration and an electrical schematic configuration of a digital camera as an imaging apparatus according to an embodiment of the present invention.

The digital camera 100 comprises an optical imaging system 110, an image sensor 101, a CPU 102, a DSP 103, an input unit 104, a monitor 105, and so on.

The optical imaging system 110 includes a plurality of lenses 111. One of the lenses 111 has an aberration control surface 112 formed on an inner surface thereof so as to generate a spherical aberration in the optical imaging system 110. In order to satisfy optical characteristics as described below, the aberration control surface 112 is formed rotationally symmetric with respect to an optical axis. The optical imaging system 110 forms a subject image to be captured, which is formed on a light receiving surface of the image sensor 101.

The image sensor 101 is, for example, a CCD or CMOS area sensor and generates an image signal corresponding to the subject image formed on the light receiving surface. An AFE performs CDS processing, A/D conversion processing, and the like on the image signal thus generated and converts the image signal into a digital signal, which is then sent to the DSP 103. The DSP 103 uses a DRAM 106 as a work memory to perform predetermined signal processing on the received image signal. The image signal after the predetermined signal processing is sent to the monitor 105, on which an optical image corresponding to the image signal is displayed. Further, it is possible to store the image signal after the predetermined signal processing, via the CPU 102, in a storage medium attachable and detachable to/from the CPU 102.

The predetermined signal processing includes a restoration processing. A dispersed image as the subject image formed by the optical imaging system 110 is a blurred optical image which has a large focal depth owing to a function of the aberration control surface 112. In order to perform the restoration processing, a filter for correcting the spherical aberration is transferred from an EEPROM 107 via the CPU 102 to the DSP 103. The filter is a blur restoration filter such as a Weiner filter, which is predefined depending on a previously measured Point Spread Function (PSF), i.e. a degree of blur, inherent in the optical imaging system 110. The DSP 103 uses the filter to perform a deconvolution processing on the image signal. With the deconvolution processing, an image with reduced blur is produced from the dispersed image.

A timing generator (TG) 108 controls various operation timings of the image sensor 101 and the DSP 103. The TG 108 also controls the operation timings of the image sensor 101 and the DSP 103 under the control of the CPU 102. Further, the CPU 102 controls not only the operation of the TG 108 but also operations of individual components of the digital camera 100. The CPU 102 is connected to an input unit 104 including input devices such as a button and a dial. On the basis of an operation input to the input unit 104 by a user, the CPU 102 controls the operations of the individual components. The CPU 102 is connected to the EEPROM 107. The EEPROM 107 stores not only the above-mentioned filter but also information required to perform various functions provided in the digital camera 100, and the CPU 102 reads out the information as necessary.

The optical characteristics of the optical imaging system 110 provided by the aberration control surface 112 is now described in detail. That is to say, the aberration control surface 112 is designed and formed in such a way that the optical imaging system 110 has the optical characteristics described below.

Figure 2:
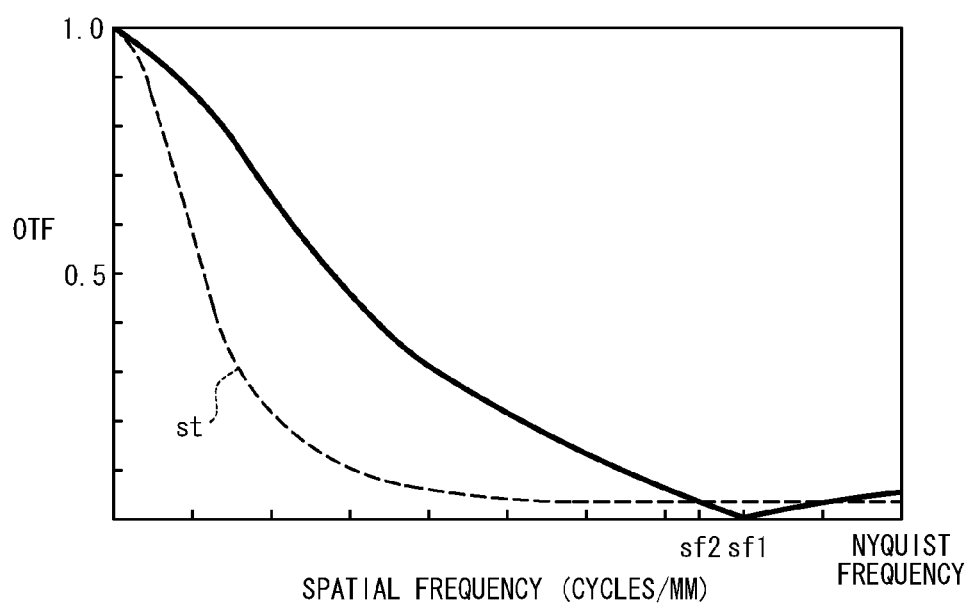
FIG. 2 is a graph showing a response of an optical transfer function with respect to a spatial frequency at an imaging position of an optical imaging system.

As shown in FIG. 2, at a first frequency (see "sf1") as a spatial frequency, a response of an optical transfer function (OTF) for a desired subject distance is zero. The first frequency is set below a Nyquist frequency of the image sensor 101 ($=1/(2\times p)$, where p is a pixel pitch of the image sensor 101) and above a request frequency, which is the spatial frequency corresponding to a resolution required for a captured image.

When the response of the OTF becomes zero, an original image cannot be restored later. Thus, the optical imaging system is conventionally designed to cause the response of the OTF of the optical imaging system to be greater than zero over the entire range of the spatial frequency from zero to the Nyquist frequency. However, since it is impossible to ensure a high response of the OTF over the entire range, the response of the OTF is generally low as a whole.

In contrast to this, in the present embodiment, the aberration control surface 112 is formed in such a way that the response of the OTF is intentionally caused to be zero at the first frequency (see "sf1" in FIG. 2), thereby causing the response of the OTF to be greater than the response of a reference OTF (see "st" in FIG. 2) in a first band whose upper limit is a second frequency (see "sf2" in FIG. 2) below the first frequency (see "sf1" in FIG. 2). The reference OTF is the OTF of the optical imaging system 110 having the same requirements as those of the present embodiment except that the response is above zero over the entire range of the spatial frequency. The higher the response of the OTF, the lower the degree of blur in the dispersed image and the less the load of the deconvolution processing. The reduced load of the deconvolution processing makes it possible to prevent an increase in noise generated in the image to be restored.

Although FIG. 2 exemplarily shows that the response of the OTF for the desired subject distance is zero, the response of the OTF for other subject distances may be zero. (It is preferred that the response of the OTF be zero between the request frequency and the Nyquist frequency over a wide range of subject distances. However, the present embodiment would be effective, for example, if the distance of the subject which is assumed to be captured frequently is determined as the desired subject distance and the response of the OTF at least for the desired subject distance is zero.)

Further, it is also possible to form the aberration control surface 112 in such a way that the response of the OTF is lower than the response of the reference OTF in a band higher than the first spatial frequency. If such characteristics are satisfied, it is possible to improve the response of the OTF in the range of the spatial frequency below the first frequency.

Further, according to the present embodiment, in a band from zero to the first spatial frequency, the response of the OTF is decreased as the spatial frequency increases. Unlike the present embodiment, by providing a peak value to the response of the OTF in a graph of the OTF with respect to the spatial frequency, it is possible to reduce an occurrence of blur with respect to the subject image of a specific frequency. However, with such a configuration, a false image is generated when capturing the subject image of a frequency other than the specific frequency. According to the present embodiment, the response of the OTF is reduced as the spatial frequency increases in the frequency range below the first spatial frequency as described above, thereby preventing the response from having a peak and suppressing the generation of the false image.

As described above, the response of the OTF does not necessarily become zero for all subject distances, but the response of the OTF does not become zero for some subject distances. Thus, by reducing the response of the OTF for such subject distances as the spatial frequency increases in the frequency range below the Nyquist frequency, the response is prevented from having a peak.

Figure 3:
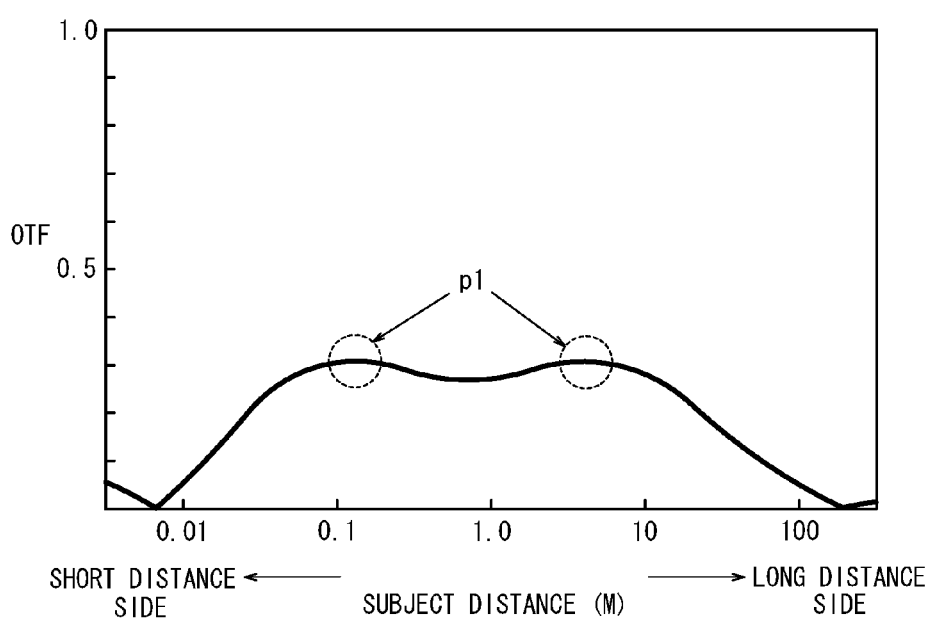
FIG. 3 is a graph showing a response of a subject distance OTF of the optical imaging system at any spatial frequency in a second band.

Further, in the optical imaging system 110, as shown in the graph of a subject distance OTF in FIG. 3, there are two peaks (see "p1") in any frequency in a second band whose maximum value is a third spatial frequency below the first spatial frequency, and an imaging position is between these two peak positions. In this way, it is possible to prevent an extreme decrease in the OTF at the imaging position by having two peaks in the third spatial frequency. Although the peak position of the subject distance OTF varies depending on the spatial frequency, as described below, the extreme decrease in the OTF at the imaging position is preferably avoided. This is because an object located at an object plane corresponding to the imaging position is considered to be a main subject and it is preferred that the noise in a reproduced image be reduced as much as possible. As long as the subject distance OTF has two peaks in any of the spatial frequency bands, it is possible to prevent the extreme decrease in the OTF at the imaging position even in other bands, and hence two peaks are not needed in all bands.

Figure 4:
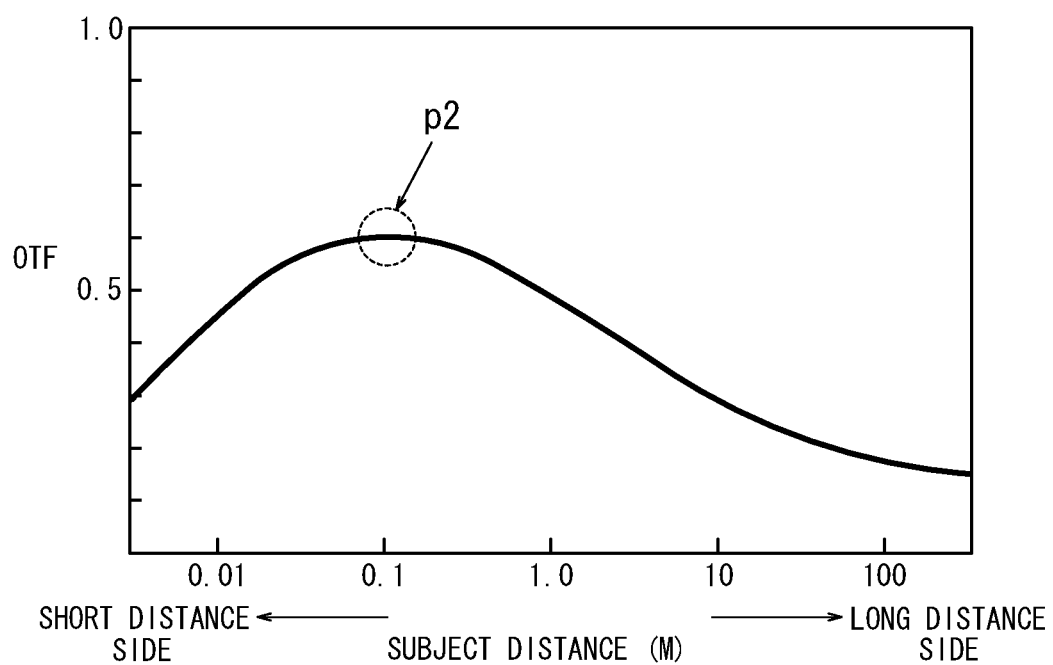
FIG. 4 is a graph showing the response of the subject distance OTF of the optical imaging system at the spatial frequency with a peak value on a short distance side.
Figure 5:
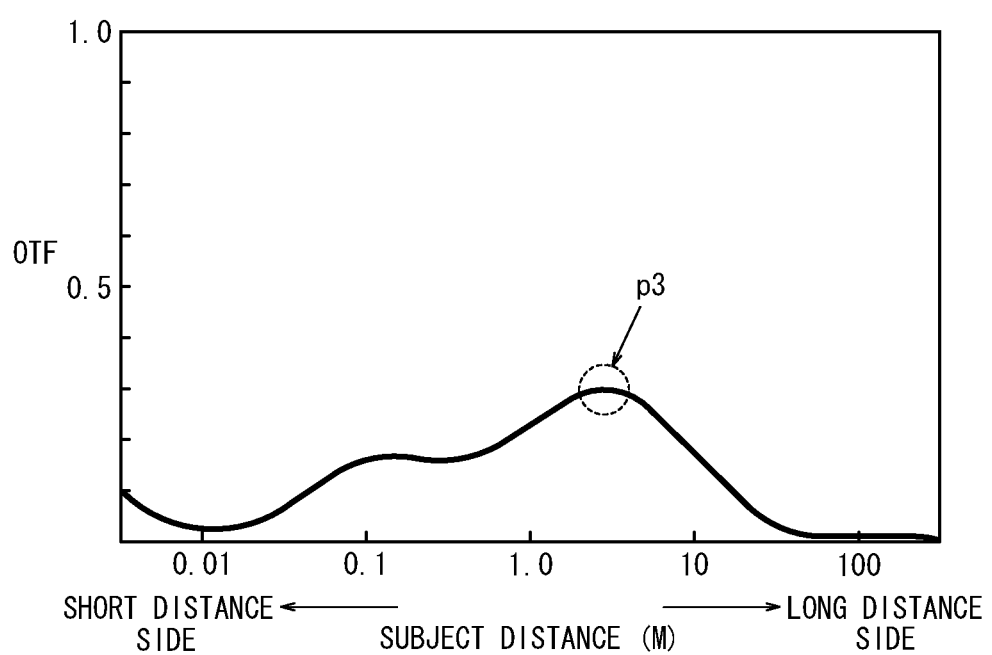
FIG. 5 is a graph showing the response of the subject distance OTF of the optical imaging system at the spatial frequency higher than the spatial frequency of the subject distance OTF shown in FIG. 4.

Further, in the optical imaging system 110, as shown in the graph of the subject distance OTF in FIGS. 4 and 5, as the spatial frequency decreases, the peak position of the subject distance OTF is shifted to the short distance side (see "p2" in FIG. 4 and "p3" in FIG. 5).

Generally, a shorter distance to the subject results in a lower spatial frequency of the optical image, and a longer distance to the subject results in a higher spatial frequency. Thus, in the case of a low spatial frequency, by providing the peak value to the subject distance OTF on the short distance side (see FIG. 4), it is possible to reduce the noise generated in the reproduced image for the optical image located at a short distance and having the low spatial frequency. Similarly, in the case of a high spatial frequency, by providing the peak value to the subject distance OTF on the long distance side (see FIG. 5), it is possible to reduce the noise generated in the reproduced image for the optical image located at a long distance and having the high spatial frequency.

Figure 6:
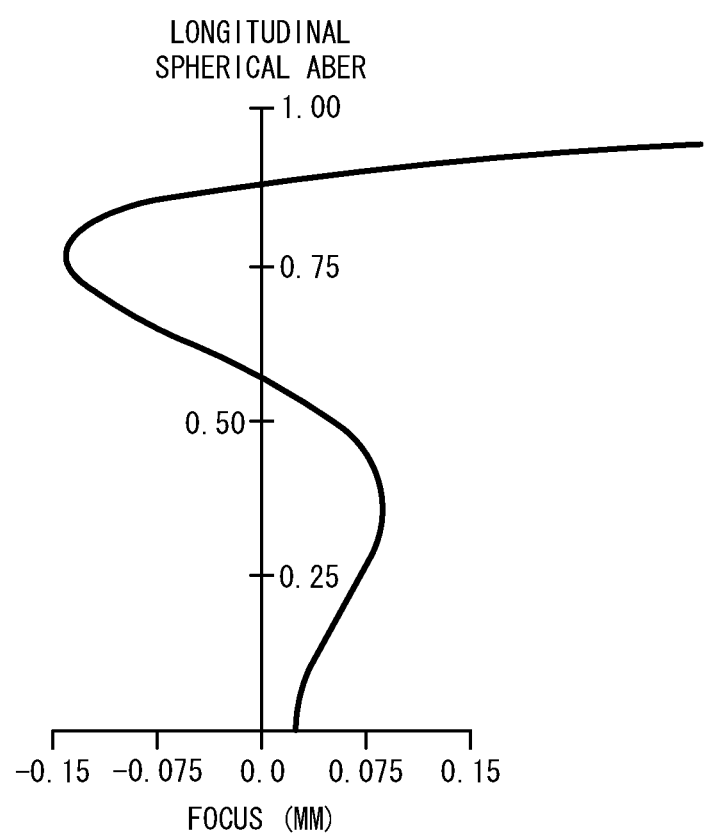
FIG. 6 is a view illustrating a spherical aberration of the optical imaging system.

As shown in FIG. 6, the optical imaging system 110 has two inflection points in a spherical aberration curve. As described above, the dispersed image having the large focal depth can be formed on the light receiving surface of the image sensor 101 by generating the spherical aberration. However, the generation of the spherical aberration may cause the extreme decrease in the OTF. In order to cope with this situation, the aberration control surface 112 is formed so as to have inflection points in a spherical aberration curve, thereby making it possible to avoid the extreme decrease in the OTF. Further, it is possible to extend the focal depth by expand an amplitude between two inflection points.

According to the imaging apparatus of the present invention having the above-mentioned configuration, as described above, causing the OTF at the first spatial frequency to be zero makes it possible to form the dispersed image, which undergoes the deconvolution processing and provides reduction in the noise generated in the resultant reproduced image, on the light receiving surface of the image sensor 101.

Although the present invention has been described on the basis of the drawings and an embodiment, it is to be noted that those skilled in the art can easily make various changes and modifications on the basis of the present disclosure. Therefore, it should be noted that these changes and modifications are within the scope of the present invention.

Figure 7:
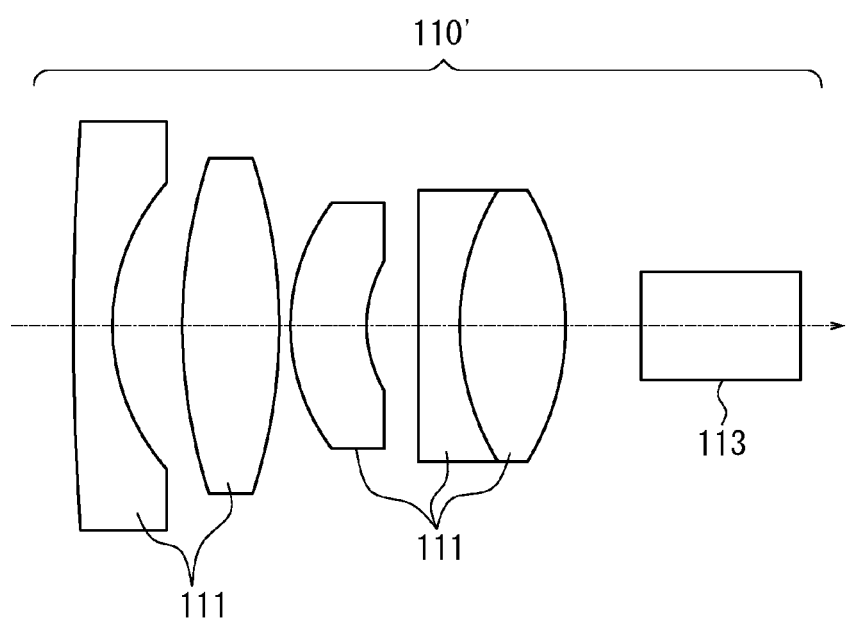
FIG. 7 illustrates a modified example of the optical imaging system provided with an aberration control element instead of an aberration control surface.

For example, in the present embodiment, the aberration control surface 112 is configured to be formed on the inner surface of one of the lenses 111 which is a component of the optical imaging system 110. However, as shown in FIG. 7, an aberration control element 113 may be included in an optical imaging system 110', the aberration control element 113 allowing generation of the optical characteristics as described above in the entire optical imaging system 110'.

Further, although the present embodiment has a configuration in which the peak of the subject distance OTF is shifted to the short distance side as the spatial frequency decreases, the peak of the subject distance OTF may be simply shifted depending on the spatial frequency. In some imaging apparatus employing the present invention, the main subject may be fixed at the long distance or at the short distance, and the spatial frequency of such a main subject may be within a specific band. Thus, the peak position may be set on the basis of the spatial frequency of the main subject corresponding to its distance.

Further, although the imaging apparatus of the present embodiment is configured to be applied to the digital camera 100, for example, it is also possible to apply the imaging apparatus of the present embodiment to other imaging apparatus such as a digital video camera, a cellular phone with a camera function, and the like.

Further, although the present invention is configured to be applied to the imaging apparatus integrally including the optical imaging system 110, the image sensor 101, the DSP 103, and so on, it is also possible to apply the present invention to a lens (lens unit) attachable and detachable to/from a camera body like a single lens reflex camera. In the case of applying the present invention to the lens unit, the lens unit is provided with a lens memory storing a filter, and when the lens unit is attached to the camera body the DSP of the camera body reads out the filter from the lens memory and performs the restoration processing on the image signal, thereby allowing the same effect as the present embodiment to be achieved. Alternatively, the lens memory may be configured to store an identification signal for discriminating the type of the lens unit. It is also possible to achieve the same effect as the present embodiment by a configuration in which a plurality of filters each corresponding to different lens units are stored in the EEPROM of the camera body and a single filter is selected on the basis of the identification signal read out from the lens memory.

Further, although the present invention is applied to the lens unit and the imaging apparatus, the present invention may be applied to an imaging unit which comprises the optical imaging system, the image sensor, and the memory and outputs the image signal to an image processing apparatus for performing the deconvolution processing operation, for example, an electronic endoscope.

REFERENCE SIGNS LIST 100 digital camera
101 image sensor
102 CPU
103 DSP
104 input unit
105 monitor
106 DRAM
107 EEPROM
108 timing generator
110, 110' optical imaging system
111 lens
112 aberration control surface
113 aberration control element

The invention claimed is:

1. An imaging apparatus comprising:
an optical imaging system having an aberration control element for generating a predetermined aberration, the optical imaging system forming an optical image;
an image sensor for generating an image signal corresponding to the optical image; and
an image processor for performing image processing on the image signal so as to enhance an image characteristic on the basis of the predetermined aberration, the image characteristic having been degraded due to the predetermined aberration,
the aberration control element causing a response of an optical transfer function to be zero for at least a predetermined subject distance of the optical imaging system at a first spatial frequency below a Nyquist frequency of the image sensor.

2. The imaging apparatus according to claim 1, wherein the aberration control element improves a response of the optical transfer function in a first band, compared to a response of a reference optical transfer function, a maximum value of the first band is a second spatial frequency, the second spatial frequency is below the first spatial frequency, a response of the reference transfer function is above zero in a range from zero to a Nyquist frequency.

3. The imaging apparatus according to claim 1, wherein at least at a first spatial frequency and a second spatial frequency, the aberration control element causes the response of the optical transfer function to decrease as the spatial frequency increases, the first spatial frequency is below the spatial frequency at which the response of the optical transfer function becomes zero for a first subject distance, the response is zero at the first subject distance, the second spatial frequency is below the Nyquist frequency for a subject distance other than the first subject distance.

4. The imaging apparatus according to claim 1, wherein the aberration control element provides the optical imaging system with a characteristic of having at least two peak positions of a subject distance optical transfer function at any frequency in a second band, a maximum value of the second band is a third spatial frequency, the third spatial frequency is below the first spatial frequency.

5. The imaging apparatus according to claim 1, wherein the aberration control element causes the peak positions of the response of the subject distance optical transfer function to be shifted depending on the spatial frequency.

6. The imaging apparatus according to claim 5, wherein the aberration control element causes the peak positions of the response of the subject distance optical transfer function to be shifted to a short distance side as the spatial frequency decreases.

7. The imaging apparatus according to claim 1, wherein the aberration control element has a surface formed in rotational symmetry.

8. The imaging apparatus according to claim 7, wherein the aberration control element generates a spherical aberration, and the spherical aberration includes an inflection point.

9. A lens unit freely attachable and detachable to/from an imaging body, the imaging body comprising an image sensor and an image processor, the image sensor generating an image signal corresponding to an optical image formed on a light receiving surface, the image processor performing an image processing on the image signal, the lens unit comprising:
an optical imaging system having an aberration control element for generating a predetermined aberration, the optical imaging system forming an optical image;
a memory for storing corresponding information, the corresponding information being at least one of information about the predetermined aberration and information matched to the predetermined aberration; and
an output unit for outputting the corresponding information,
the aberration control element causing a response of an optical transfer function to be zero for at least a predetermined subject distance of the optical imaging system at a first spatial frequency below a Nyquist frequency of the image sensor,
the image processor performing image processing on the image signal so as to enhance an image characteristic on the basis of the predetermined aberration defined by the corresponding information, the image characteristic having been degraded due to the predetermined aberration.

10. An imaging unit attachable and detachable to/from an image processing apparatus, the imaging unit comprising:
an image sensor for generating an image signal corresponding to an optical image formed on a light receiving surface;
an optical imaging system having an aberration control element for generating a predetermined aberration, the optical imaging system forming an optical image;
a memory for storing corresponding information, the corresponding information being one of information about the predetermined aberration and information matched to the predetermined aberration; and an output unit for outputting the corresponding information, the aberration control element causing a response of an optical transfer function to be zero for at least a predetermined subject distance of the optical imaging system at a first spatial frequency below a Nyquist frequency of the image sensor, the image processing apparatus performing image processing on the image signal so as to enhance an image characteristic on the basis of the predetermined aberration defined by the corresponding information, the image characteristic having been degraded due to the predetermined aberration.

* * * * *